US010539421B2

(12) United States Patent
Sheard et al.

(10) Patent No.: US 10,539,421 B2
(45) Date of Patent: Jan. 21, 2020

(54) INERTIAL NAVIGATION SYSTEM WITH COMPENSATION OF ROLL SCALE FACTOR ERROR

(71) Applicant: Atlantic Inertial Systems Limited, Plymouth, Devon (GB)

(72) Inventors: John Keith Sheard, Plymouth (GB); Nicholas Mark Faulkner, Plymouth (GB)

(73) Assignee: ATLANTIC INERTIAL SYSTEMS, LIMITED, Devon (GB)

( * ) Notice: Subject to any disclaimer, the term of this patent is extended or adjusted under 35 U.S.C. 154(b) by 149 days.

(21) Appl. No.: 15/522,360

(22) PCT Filed: Oct. 27, 2015

(86) PCT No.: PCT/GB2015/053216
§ 371 (c)(1),
(2) Date: Apr. 27, 2017

(87) PCT Pub. No.: WO2016/067011
PCT Pub. Date: May 6, 2016

(65) Prior Publication Data
US 2017/0322030 A1 Nov. 9, 2017

(30) Foreign Application Priority Data

Oct. 27, 2014 (GB) .................................. 1419095.3

(51) Int. Cl.
*G01C 21/16* (2006.01)
*F42B 15/01* (2006.01)
(Continued)

(52) U.S. Cl.
CPC ............... *G01C 21/16* (2013.01); *F41G 7/36* (2013.01); *F42B 15/01* (2013.01); *G01C 25/005* (2013.01)

(58) Field of Classification Search
None
See application file for complete search history.

(56) References Cited

U.S. PATENT DOCUMENTS

| 4,343,035 A * | 8/1982 | Tanner | G01C 21/16 244/175 |
|---|---|---|---|
| 4,675,820 A * | 6/1987 | Smith | G01C 21/16 701/501 |

(Continued)

FOREIGN PATENT DOCUMENTS

| GB | 2439987 A | 1/2008 |
|---|---|---|
| WO | 2015128610 A1 | 9/2015 |

OTHER PUBLICATIONS

IPO Search Report for International Application No. GB1419095.3, dated Apr. 24, 2015, 1 page.
(Continued)

*Primary Examiner* — Bernarr E Gregory
(74) *Attorney, Agent, or Firm* — Cantor Colburn LLP

(57) ABSTRACT

An inertial measurement system (200) for a longitudinal projectile, comprising a first, roll gyro to be oriented substantially parallel to the longitudinal axis of the projectile; a second gyro and a third gyro with axes arranged with respect to the roll gyro such that they define a three dimensional coordinate system. The system further comprises a controller (225, 250), arranged: —to compute a current projectile attitude from the outputs of the first, second and third gyros, the computed attitude comprising a roll angle, a pitch angle and a yaw angle; —for at least two time points, to compare the computed pitch and yaw angles with expected values for the pitch and yaw angles; —for each of said at least two time points, to calculate a roll angle error based on the difference between the computed pitch and yaw angles and the expected pitch and yaw angles; —to calculate a roll angle error difference between said at least two time points; —to (Continued)

calculate the total roll angle subtended between said at least two time points; —to calculate a roll angle scale factor error based on said computed roll angle error difference and said total subtended roll angle and apply the calculated roll angle scale factor error to the output of the roll gyro.

15 Claims, 2 Drawing Sheets

(51) Int. Cl.
*G01C 25/00* (2006.01)
*F41G 7/36* (2006.01)
*F41G 7/00* (2006.01)

(56) References Cited

U.S. PATENT DOCUMENTS

| | | | | |
|---|---|---|---|---|
| 5,001,647 | A * | 3/1991 | Rapiejko | G01C 21/16 244/3.2 |
| 5,442,560 | A * | 8/1995 | Kau | G01C 21/16 701/502 |
| 5,527,003 | A * | 6/1996 | Diesel | G01C 21/16 244/195 |
| 5,886,257 | A | 3/1999 | Gustafson et al. | |
| 5,890,093 | A * | 3/1999 | Mark | G01C 21/16 701/505 |
| 7,912,664 | B2 * | 3/2011 | Rozelle | G01C 25/005 702/104 |
| 8,010,308 | B1 * | 8/2011 | Churchill | G01C 25/005 702/104 |
| 8,047,070 | B2 | 11/2011 | Tyree | |
| 8,718,937 | B2 * | 5/2014 | Morgan | G01C 25/005 701/500 |
| 2010/0133374 | A1 | 6/2010 | Geswender et al. | |
| 2013/0192074 | A1 | 8/2013 | Shaltiel et al. | |

OTHER PUBLICATIONS

Luisa D. Fairfax and Frank E. Fresconi, "Position Estimation for Projectiles Using Low-cost Sensors and Flight Dynamics", Army Research Laboratory, Apr. 2012, 38 pages.

PCT International Search Report and Written Opinion of the International Searching Authority, or the Declaration, for International Application No. PCT/GB2015/053216, dated Feb. 9, 2016, 13 pages.

* cited by examiner

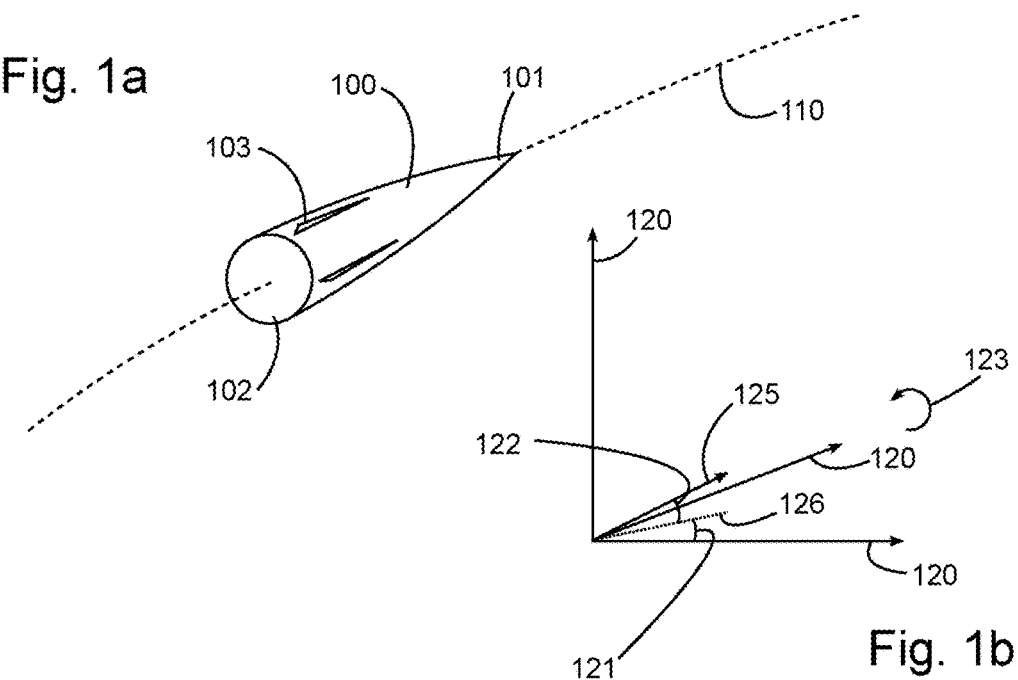
Fig. 1a
Fig. 1b
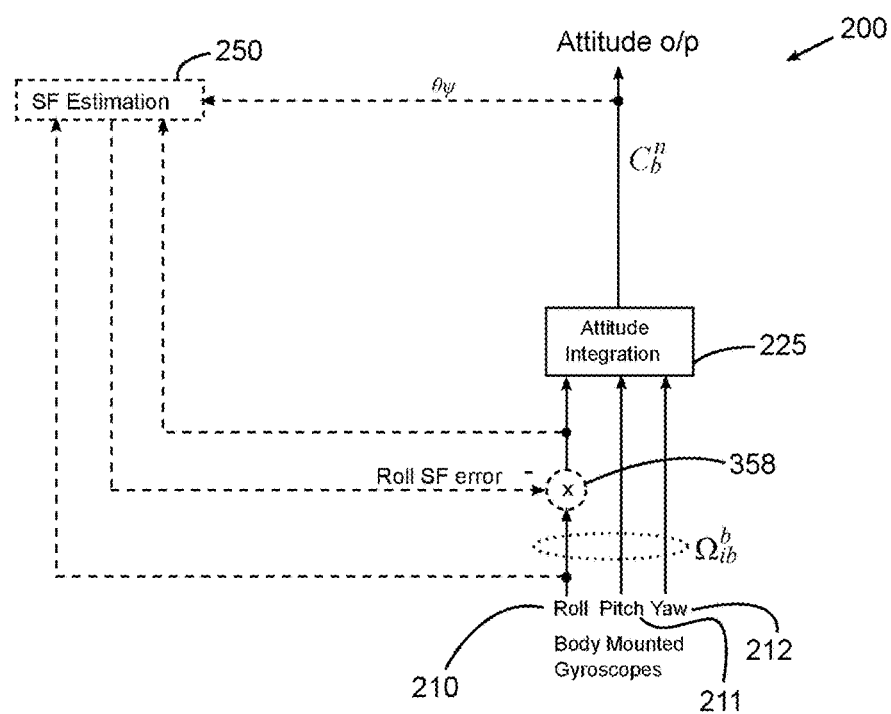
Fig. 2

INERTIAL NAVIGATION SYSTEM WITH COMPENSATION OF ROLL SCALE FACTOR ERROR

CROSS REFERENCE TO RELATED APPLICATIONS

This is a US National Stage of Application No. PCT/GB2015/053216, filed on Oct. 27, 2015, which claims the benefit of GB Application No. 1419095.3 filed Oct. 27, 2014, the disclosures of which are incorporated herein by reference.

TECHNICAL FIELD

This disclosure relates to inertial navigation systems, in particular those used for projectiles e.g. guided rockets. Inertial navigation systems can be used on guided projectiles to provide position information which can in turn be used to correct the projectile's course to keep it on target.

BACKGROUND

Navigation systems can use a variety of different sensors to detect changes to the motion and orientation of an object. For example accelerometers, gyros and magnetometers are often used. Accelerometers detect applied force, gyros detect rotation rates and magnetometers detect the Earth's magnetic field and so can be used to determine absolute orientation.

Inertial navigation systems, based on accelerometers and gyroscopes, can be used either on their own or together with other navigation systems such as GPS.

Navigation/guidance of rockets and other munitions is often based on the use of micro-electro-mechanical (MEMS) sensors due to their small size and low-cost. The accuracy of these sensors is relatively poor and not sufficient to meet typical navigation requirements unless external sensors are used to estimate and correct the inertial sensor errors. Using additional aiding sensors in this way is the basis of what is known as 'integrated navigation'.

Integrated navigation is usually based on an algorithmic technique known as Kalman Filtering, a process which blends data from the inertial sensors and the external sensors in an optimal way. For this technique to operate robustly, navigation errors must be maintained within certain limits at all times else the linearity assumptions on which the Kalman filter is founded will not be valid and the integrated navigation solution may become grossly inaccurate. It is desirable to avoid this situation by constraining navigation error growth during projectile flight.

When considering navigation Kalman filtering for applications involving rockets, missiles and other rotating platforms, initialising and maintaining an accurate roll (bank) angle presents the biggest challenge. An analysis of the problems associated with the use of inertial guidance technology in such applications is provided by J. S. Bird in "Inertial Sensor Performance Requirements for a Long Range Artillery Rocket" (DTIC ADA279936), with the conclusion that the roll gyro scale factor accuracy is critical and needs to be less than 5 parts-per-million (ppm).

Unfortunately, inexpensive low grade MEMS gyroscopes have a scale factor error of several thousand ppm. Using a gyroscope with a scale factor accuracy of less than 5 ppm would not be practical in terms of cost. Therefore there is a need for a system that can achieve the desired positional accuracy using inexpensive sensors with much lower scale factor accuracy.

The errors in gyroscope sensors are broadly divided into bias errors and scale factor errors. Although these and other errors are measured and removed as part of a factory calibration process, there will always be residual errors present when the sensors are actually used. These arise for a variety of reasons such as temperature and humidity changes, as well as other physical stresses affecting the unit. In general these errors may be different each time the unit is switched on.

As discussed in the above-referenced paper by J. S. Bird, in strapdown inertial navigation systems (i.e. those in which the inertial sensors are fixed to the body of the airframe as opposed to those in which the sensors are mounted on a gimballed platform that is free to rotate and so remain level at all times), one of the biggest problems comes from high roll rates. Typically roll rates for ballistic projectiles may be of the order of 10-20 full rotations per second, i.e. rotation rates of the order of a few thousand degrees per second. Therefore with a typical roll rate scale factor error of 1000 ppm, the roll angle (bank angle) calculated from this gyro would accumulate an error of a few degrees per second. For a typical projectile range of 30 to 60 km and a typical flight time of 1 to 2 minutes, this error quickly mounts up to be unacceptable.

Gyro bias error can readily be compensated immediately prior to use by averaging a series of readings while the gyro is known to be in a non-rotating state, e.g. prior to launch in the case of a projectile such as a rocket or missile. However, the scale factor error is rate-dependent and may not be measured and corrected whilst stationary. This suggests the need for a scale factor error correction process which operates in-flight, in a wholly self-contained fashion. This disclosure details such a process.

Alternative techniques which have been used in attempts to maintain roll accuracy include the use of non-inertial sensor aiding such as magnetometer, light sensor, GPS and/or thermopiles. These approaches add complexity and cost and introduce additional performance constraints. See for example "Attitude Determination with Magnetometers for un-Launched Munitions", M. J. Wilson, DTIC ADA425992; and "On the Viability of Magnetometer-Based Projectile Orientation Measurements", T. E. Harkins, DTIC ADA474475.

"Position Estimation for Projectiles Using Low-cost Sensors and Flight Dynamics" by L. D. Fairfax and F. E. Fresconi (DTIC ADA560811) describes another solution to this problem for gun-launched mortars which relies upon a multi-state Extended Kalman Filter to estimate position and velocity, but roll angle is determined via additional attitude aiding. This technique is applied to an application with a more benign roll rate profile than a typical artillery rocket.

U.S. Pat. No. 8,047,070 describes a process for estimating the roll angle of a gun-launched projectile. U.S. Pat. No. 8,047,070 uses body angular rate data as its measurements, as opposed to derived Euler angles. It also does not estimate or correct the roll rate scale factor error and it does not operate to preserve elevation and heading accuracy.

SUMMARY

According to this disclosure, there is provided an inertial measurement system for a longitudinal projectile comprising: a first, roll gyro to be oriented substantially parallel to the longitudinal axis of the projectile; a second gyro and a third gyro with axes arranged with respect to the roll gyro such that they define a three dimensional coordinate system; a controller, arranged to: compute a current projectile attitude from the outputs of the first, second and third gyros, the computed attitude comprising a roll angle, a pitch angle and a yaw angle; for at least two time points, compare the computed pitch and yaw angles with expected values for the pitch and yaw angles; for each of said at least two time points, calculate a roll angle error based on the difference between the computed pitch and yaw angles and the expected pitch and yaw angles; calculate a roll angle error difference between said at least two time points; calculate the total roll angle subtended between said at least two time points; calculate a roll angle scale factor error based on said computed roll angle error difference and said total subtended roll angle; and apply the calculated roll angle scale factor error to the output of the roll gyro.

This system provides improved calibration of the roll axis rate gyro scale factor, e.g. of an Inertial Measurement Unit (IMU) fitted to a rolling projectile. As discussed above, the errors in the roll rate measurement are the most significant source of error in high roll rate navigation systems. Earlier systems have struggled to cope with the high roll rates that are present in the earliest phase of flight, i.e. immediately after launch, and attempts have been made to mitigate these effects. For example one possibility could be to employ an intermediate attitude reset function to reset the attitude at some point in time after the initial high roll rate has reduced to more manageable levels. However, such an attitude reset function would be reliant on the presence of linear accelerometers to provide measurements of the current velocity. The system according to this disclosure does not require any such attitude reset and can instead be operated right from launch, providing good roll rate correction even during the high roll rate phase immediately after launch.

The process described here to correct the roll axis scale factor error is complementary to other systems and can be used in combination with them, or it can be used as a standalone system. For example, its operation may be complementary to a roll angle correction process and it may be active prior to the roll angle correction process initialising, although the processes are not dependent upon each other and either could be implemented independently.

This new process offers better performance and is not reliant upon a 6 degree of freedom IMU as it only uses angular rate measurements, with no reliance on linear accelerometers. This system is therefore suitable for a greater range of applications. In particular, it can be used in less expensive navigation systems that may be employed on smaller and/or simpler projectiles which would typically only use 3 degree of freedom IMUs with only gyros.

Preferably the roll gyro is a MEMS (Micro Electro Mechanical System) gyro. All three gyros may be MEMS gyros. In some examples, the roll gyros may be a MEMS gyro with a rate scale factor error of greater than 100 parts per million. In some examples, the rate scale factor error may be greater than 1000 parts per million. As the scale factor error can be corrected by the feedback system, a high scale factor error can be tolerated. Thus lower quality, less expensive components can be used, reducing the cost of the system while maintaining excellent accuracy.

In some examples, the expected values for pitch and yaw angles as a function of time may correspond to those expected from planar ballistic flight. Planar ballistic flight refers to the trajectory that results when the only significant forces acting on the airframe are gravity and aerodynamic drag acting in the longitudinal axis. In general, there will always be other forces present but in many applications these will either be small or will have a neutral deflection effect due to the rolling motion of the airframe. The resulting trajectory will therefore be substantially in one plane and during such flight the heading angle (yaw angle) is not expected to change for the duration of that flight. The elevation angle (pitch angle) is expected to decrease at a known rate throughout the flight as a longitudinal projectile (which typically has fins for stability) tends to orientate itself at a tangent to its trajectory. Note that this flight may be one phase of a more complex flight plan, with subsequent phases involving corrective manoeuvres that deviate from the planar trajectory.

Using planar ballistic heading and elevation angles for the expected yaw and pitch angles means that the system treats any deviation in calculated yaw and pitch angles from the expected ballistic trajectory to have resulted from errors in the roll angle calculation.

Preferably the roll angle error is calculated as the angle whose tangent is the ratio of the rate of change of the calculated yaw angle to the rate of change of the calculated pitch angle. In some examples, the ratio may include a negative sign due to the geometrical definitions. For example, the roll angle error may be calculated as the angle whose tangent is the ratio of the rate of change of the calculated yaw angle to the negative of the rate of change of the calculated pitch angle.

The inertial measurement system may further comprise a low pass filter arranged to filter out high frequency components of changes in the yaw angle and the pitch angle before calculation of the rate of change of the yaw angle and the rate of change of the pitch angle. A time constant of the low pass filter may be increased at high roll rates and decreased at low roll rates.

In the case of projectiles that do not follow a purely planar trajectory, but still follow a predictable trajectory, the predicted yaw and pitch angles throughout the flight can still be used as reference values. One such example would be a spin-stabilised artillery shell which spins at very high rate (greater than 100 revolutions per second), which results in many forces which act to deflect the course of the shell. Any deviation of yaw and pitch angles from the reference values can be taken to have resulted from errors in the roll angle calculation. In such cases, pre-computed flight trajectory information is loaded into the onboard navigation system. This may be in the form of a flight path aiding table (FPAT) or similar. For many projectiles/munitions, the likely flight trajectory from launch point to target is established during a pre-launch mission planning process. This process usually yields tabular data describing the expected position, velocity and attitude of the projectile as a function of flight time (the FPAT). This data may be transferred to the projectile and used during flight for various purposes related to navigation/guidance. The expected yaw and pitch values can be continuously looked up during the flight as required. Therefore the expected values for pitch and yaw angles as a function of time may be taken from pre-computed flight trajectory information.

Although the calculated roll rate scale factor error could simply be applied directly as a full correction, it is generally found better to apply a gain factor or weighting coefficient to reduce this correction, thereby avoiding overcompensation and facilitating rapid convergence on stability. It is generally preferred to apply only a proportion of the calculated error, in accordance with conventional control theory. By careful selection of this gain factor, the stability and convergence characteristics of the correction loop can be optimised. Therefore preferably the roll rate scale factor error is multiplied by a roll rate scale factor error gain factor before being applied to the output of the roll gyro.

The gain factor may be time varying if required. This may be pre-calculated analytically, using techniques based on control theory, or calculated dynamically, using a Kalman filter or other linear estimator. If not computed dynamically, a time-varying gain may be implemented via use of a pre-computed look-up-table. For example the look-up-table may indicate gain K1 from time t1 to t2, gain K2 from time t2 to t3, etc. However, in some applications simple fixed gain values will suffice. The gain factor may be a fixed value. More complex solutions may be applied where required.

In an alternative system, the roll rate scale factor error gain may be proportional to the reciprocal of the instantaneous roll rate as this reflects the relationship between roll rate scale factor error and roll rate. In other systems, the reciprocal of the instantaneous roll rate may feature in the gain factor computation as it reflects the relationship between roll rate scale factor error and roll rate As discussed above, the system may be used with either simple or complex systems, with the roll scale factor error correction either being the sole feedback element or being complementary to other corrections and/or feedback mechanisms. However, in some preferred examples, the inertial measurement system has no linear accelerometers. The hardware (i.e. the IMU) required for such implementations is less expensive than more complex IMUs such as six degree of freedom IMUs. In other preferred examples, the system has only angular rate measurement devices, e.g. gyros.

The time difference between the two (or more) time points at which roll angle error is estimated can vary greatly. The choice of time interval over which to measure the difference in roll angle error will depend on a number of factors such as the type of projectile, the type of flight and possibly expected flight conditions. The time interval will preferably be selected for maximum stability, i.e. long enough for smoothing out any rapid fluctuations, but is also preferably short enough that corrections are applied frequently enough to keep the navigation calculations accurate and stable, i.e. with enough feedback to prevent the system losing stability. In some preferred examples, the difference in time between the at least two time points is at least the time between samples of the roll gyro, i.e. it is limited by the sampling rate of the IMU hardware. The upper limit of the time difference may be many seconds.

According to another aspect, this disclosure provides a method of correcting roll angle in an inertial measurement system for a longitudinal projectile, comprising: computing a current projectile attitude comprising a roll angle, a pitch angle and a yaw angle; for at least two time points, comparing the computed pitch and yaw angles with expected values for the pitch and yaw angles; for each of said at least two time points, calculating a roll angle error based on the difference between the computed pitch and yaw angles and the expected pitch and yaw angles; calculating a roll angle error difference between said at least two time points; calculating the total roll angle subtended between said at least two time points; calculating a roll angle scale factor error based on said computed roll angle error difference and said total subtended roll angle; and applying the calculated roll angle scale factor error to the output of a roll gyro.

All of the preferred features described above in relation to the system are equally applicable to this corresponding method. In preferred examples, the method and system are particularly applicable to high roll rate projectiles, i.e. projectiles intended to be imparted with a high roll rate during flight, e.g. greater than 5, greater than 10 or greater than 15 revolutions per second.

BRIEF DESCRIPTION OF DRAWINGS

One or more non-limiting examples will now be described, by way of example only, and with reference to the accompanying figures in which:

FIG. 1a shows a projectile in flight;

FIG. 1b illustrates the attitude of the projectile;

FIG. 2 shows an inertial navigation system; and

FIG. 1a illustrates a rocket 100 in flight. Its trajectory 110 is shown in broken line. The rocket 100 has a nose 101, tail 102 with fins 103. Fins 103 may be static or they may be movable so as to provide directional control so as to alter the flight path of the rocket 100.

Figure 3:
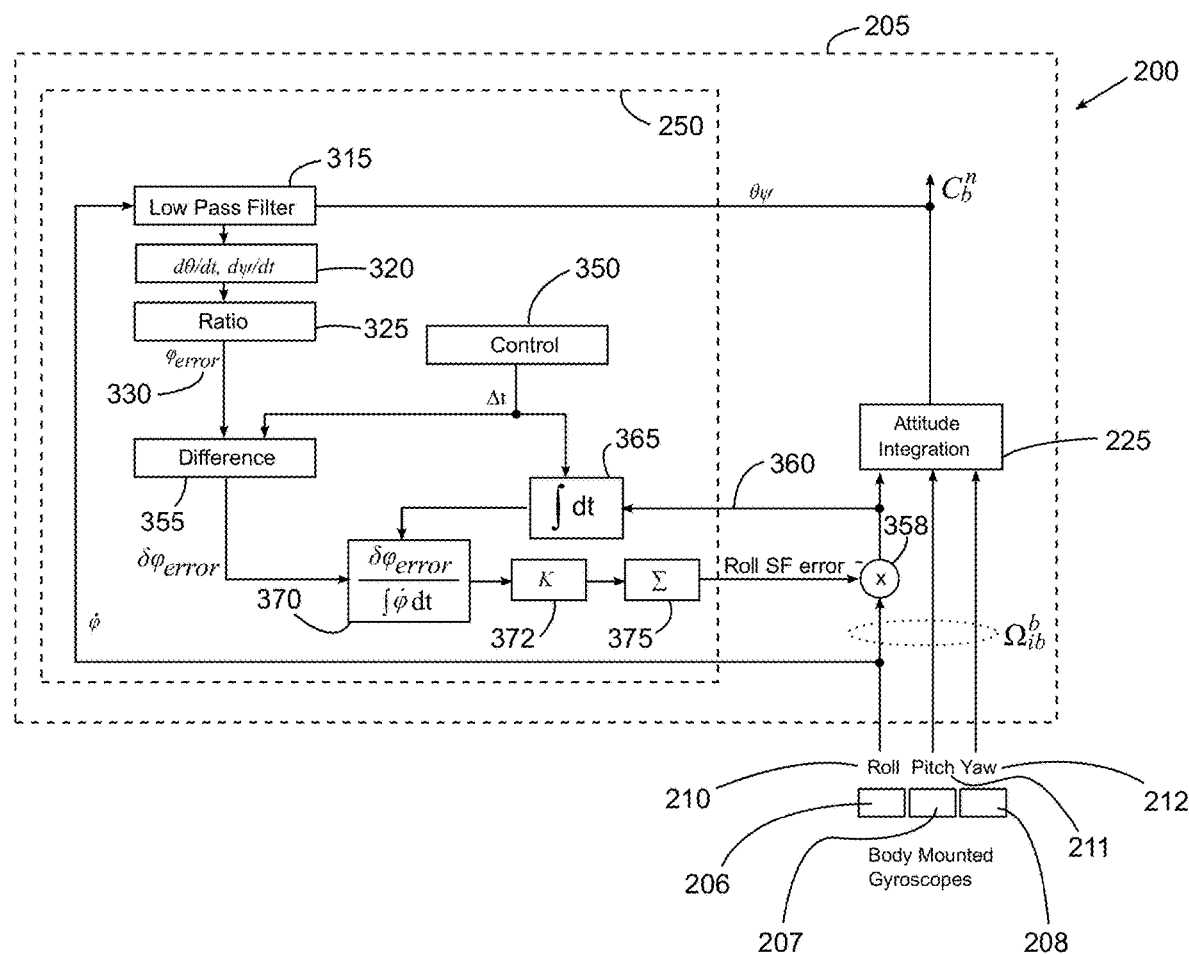
FIG. 3 shows a roll control process in detail.

In inertial navigation terminology, the orientation of a body/platform is described in terms of the three Euler angles 'heading, 'elevation' and 'bank'. The equivalent terms yaw', 'pitch' and 'roll' are also in use. The body orientation is generally referred to using the term 'attitude'. Although strictly speaking the term 'attitude' refers only to the elevation and bank angles, in this document, the more general definition is used. Therefore in this document, the term 'attitude' refers to all three of heading, elevation and bank (or equivalently yaw, pitch and roll).

A 'quaternion' is a 4-element hyper-complex number used in inertial navigation as a convenient method of maintaining and propagating heading/attitude angles. Use of quaternions avoids the numeric singularities that can occur when Euler angles are manipulated directly. The use of quaternions in navigation systems is well known and is not described further here.

In FIG. 1b the attitude 125 of the rocket 100 is shown with respect to the axes 120 of the navigation frame of reference. The projection of the attitude 125 onto the horizontal plane is shown by dotted line 126. The heading or yaw angle of the rocket is shown by the angle 121, the elevation or pitch angle of the rocket is shown by the angle 122 and the bank or roll angle of the rocket about its longitudinal axis is indicated by arrow 123. The rocket 100 is rotating anti-clockwise when viewed from behind as shown.

FIG. 2 illustrates in a general way how the scale factor estimation process fits in with the normal attitude integration process. The raw inputs of the inertial navigation system 200 are the roll, pitch and yaw rates from the body mounted gyroscopes indicated at 210, 211 and 212 respectively.

In a standard navigation system (ignoring for the moment the additional roll control functions of this example), the gyroscope outputs 210, 211, 212 are integrated by the attitude integration function 225.

As mentioned earlier, this example does not require linear accelerometers in order to function. However, in more complex systems where body mounted linear accelerometers are provided, the attitude integration function may also take into account other corrections such as Earth Rate Correction, Transport Rate Correction, Coriolis & Centripetal Correction and Gravity Correction. Each of these corrections are based on the position and velocity data derived from the accelerometers. These corrections and the associated transformations between reference frames are all well-known and understood and will therefore not be described further here. However, to aid understanding, the symbols in FIGS. 2 and 3 have the following meanings:

$C_b^n$ Transformation matrix–body to navigation reference frames
$\Omega_{ib}^b$ Body rotation rate in the body frame of reference
$\theta$ Inertially derived Elevation (pitch) angle
$\varphi$ Inertially derived Bank (roll) angle
$\psi$ Inertially derived Heading (yaw) angle
$\varphi_{error}$ Bank (roll) angle error estimate
$\delta\varphi_{error}$ Change in Bank (roll) angle error estimate
$\dot{\varphi}$ Inertially measured roll rate $$\frac{\partial \theta}{\partial t}$$

Inertially derived Elevation (pitch) angle rate $$\frac{\partial \psi}{\partial t}$$

Inertially derived Heading (yaw) angle rate
$\Delta t$ Time interval.

The Scale Factor estimation process 250 is indicated in FIG. 2 in dashed lines, as an addition to the conventional attitude integration function 225 indicated in solid lines. This complete process is designed to operate during the early flight phase of a surface launched rocket or other high roll-rate projectile, when the roll rates are typically high (e.g. 10 Hz to 20 Hz).

The inertial navigation system 200 of FIG. 2 combines two of the outputs from the attitude integration function (Elevation $\theta$ and Heading $\psi$ angles) with the IMU roll axis rate measurement ($\dot{\varphi}$) 210 to derive an estimate of the roll axis scale factor error, which is then available to correct the roll axis rate measurement.

FIG. 3 shows the inertial navigation system 200 in more detail. The inertial navigation system 200 includes a controller 205, a first, roll gyro 206, a second, pitch gyro 207 and a third, yaw gyro 208.

The detail of the Scale Factor Estimation function 250 is indicated in FIG. 3 by the dashed line. The parameter $\varphi_{error}$ is derived from the measurement of roll rate and the derived Elevation and Bank Euler angles ($\theta$ and $\psi$) in the following manner:

$\varphi_{error}$ is derived as a correction to the existing Bank (roll) estimate, the correction being the ratio between the Heading (yaw) rate and the Elevation (pitch) rate as calculated from the attitude integration module 225. In other words, the Bank angle error is the angle having the ratio of Heading (yaw) rate to Elevation (pitch) rate as its trigonometric tangent. This calculation is based on the assumption that the rocket trajectory is purely planar i.e. it maintains the same fixed heading throughout the flight. The elevation angle in such flight is also expected to decrease at a constant, predictable rate. This calculation is based on the assumption that any deviation in Heading (yaw) angle must have arisen through errors in the Bank (roll) angle calculation. This technique may however be extended to applications involving non-planar trajectories (e.g. spinning artillery shells) using prior knowledge of the expected heading profile. In such cases, a similar calculation can be made using the deviation of the calculated Heading (yaw) angle compared with the expected/predicted Heading (yaw) angle and assuming that any such deviations have arisen through errors in the Bank (roll) calculation.

The Heading (yaw) and Elevation (pitch) rates are continuously calculated as the time derivative of low-pass filtered forms of the Heading (yaw) and Elevation (pitch) angles from the attitude integration module 225. The low pass filter gain is varied according to the roll rate, to accommodate the effect of roll rate on the characteristics of unwanted modulations in the heading and elevation angles. The frequency and magnitude of the unwanted modulations are related to roll rate, therefore the low pass filter performs better if adjusted by the roll rate. The scheme implemented in this example uses the roll rate (i.e. $\dot{\varphi}$) to adjust the time constant of the low pass filter 315. The time constant is increased at high roll rates and decreased at low roll rates so that there is more smoothing of theta and psi at high roll rates. This reflects the fact that, at high roll rates, the roll angle error will generally be larger than at low roll rates (because the underlying issue is gyro scale factor error). It is the size of the roll angle error that determines the numeric size of the time derivatives of theta and psi, hence these will be larger and more observable at high roll rates. This allows more smoothing to be applied whilst still maintaining sufficient sensitivity in terms of determining the roll angle error. It will be appreciated that this is just one possible approach. There are other ways of manipulating the low pass filter 315 that could be used instead. The particular choice of algorithm is not critical.

Referring to FIG. 3, the Heading (yaw, psi) and Elevation (pitch, theta) angles are extracted from the attitude integration module 225 and fed into low pass filter 315 which filters out unwanted high frequency components. Time derivatives of Elevation (pitch) angle, $$\frac{\partial \theta}{\partial t}$$

and Heading (yaw) angle, $$\frac{\partial \psi}{\partial t}$$

are calculated by time-derivative module 320 and the ratio of these time derivatives is calculated in Ratio module 325. The ratio is output as the roll angle error ($\varphi_{error}$) 330.

The $\varphi_{error}$ parameter 330 is then used to estimate the Roll Rate Scale Factor error in the following manner:

1. A time interval, $\Delta t$, is determined by the Control function 350; the time interval is set in accordance with the dynamic characteristics of the host platform and can vary from the IMU data sample rate up to an extended period of many seconds.
2. The change in the $\varphi_{error}$ parameter is computed over the time interval $\Delta t$ by Difference module 355.
3. The corrected Roll Rate measurement 360 (i.e. the raw gyro rate output 210 corrected by the scale factor adjustment module 358) is integrated by Integration module 365 to estimate the total subtended Roll angle over the time interval $\Delta t$.
4. The ratio of these two derived parameters is calculated in ratio module 370 and is used as an estimate for the residual Scale Factor error $\delta\varphi_{error}/\partial\dot{\varphi}dt$ at the end of the time interval $\Delta t$.
5. A Gain factor 372 ($\kappa$), normally <1, is applied to ensure overall stability.

6. Successive residual Scale factor error estimates are accumulated by Summing module 375 to form the total Scale Factor error estimate.

7. The total Scale Factor error estimate is applied as a correction to the Roll Rate measurement by scale factor adjustment module 358.

This process applies improved techniques and achieves improved performance by providing the ability to calibrate the Roll Rate Scale Factor error under prolonged high roll rate conditions and from early in the flight trajectory. The process results in a more accurate and earlier correction to the IMU Roll axis Scale Factor error. Additionally this process has no reliance upon a full navigation solution (e.g. it is not reliant on linear accelerometers) and can be applied to simpler guidance applications and rate-only IMUs, thus saving on cost and simplifying implementations.

The invention claimed is:

1. An inertial measurement system for a longitudinal projectile comprising:
    a first, roll gyro to be oriented substantially parallel to the longitudinal axis of the projectile;
    a second gyro and a third gyro with axes arranged with respect to the roll gyro such that they define a three dimensional coordinate system;
    a controller, arranged to:
        compute a current projectile attitude from the outputs of the first, second and third gyros, the computed attitude comprising a roll angle, a pitch angle and a yaw angle;
        for at least two time points, compare the computed pitch and yaw angles with expected values for the pitch and yaw angles;
        for each of said at least two time points, calculate a roll angle error based on the difference between the computed pitch and yaw angles and the expected pitch and yaw angles;
        calculate a roll angle error difference between said at least two time points;
        calculate the total roll angle subtended between said at least two time points;
        calculate a roll angle scale factor error based on said computed roll angle error difference and said total subtended roll angle; and
        apply the calculated roll angle scale factor error to the output of the roll gyro.

2. An inertial measurement system as claimed in claim 1, wherein the roll gyro is a MEMS gyro.

3. An inertial measurement system as claimed in claim 1, wherein the expected values for pitch and yaw angles as a function of flight time correspond to those expected from planar ballistic flight.

4. An inertial measurement system as claimed in claim 3, wherein the roll angle error is calculated as the angle whose tangent is the ratio of the rate of change of the calculated yaw angle to the rate of change of the calculated pitch angle.

5. An inertial measurement system as claimed in claim 4, further comprising a low pass filter arranged to filter out high frequency components of changes in the yaw angle and the pitch angle before calculation of the rate of change of the yaw angle and the rate of change of the pitch angle.

6. An inertial measurement system as claimed in claim 5, wherein a time constant of the low pass filter is increased at high roll rates and decreased at low roll rates.

7. An inertial measurement system as claimed in claim 1, wherein the expected values for pitch and yaw angles as a function of flight time are taken from a pre-computed flight trajectory which may be non-planar.

8. An inertial measurement system as claimed in claim 1, wherein the roll scale factor error is multiplied by a roll scale factor error gain factor before being applied to the output of the roll gyro.

9. An inertial measurement system as claimed in claim 8, wherein the gain factor is a fixed value.

10. An inertial measurement system as claimed in claim 8, wherein the roll scale factor error gain is proportional to the reciprocal of the instantaneous roll rate.

11. An inertial measurement system as claimed in claim 1, wherein the system has no linear accelerometers.

12. An inertial measurement system as claimed in claim 1, wherein the difference in time between the at least two time points is at least the time between samples of the roll gyro.

13. A method of correcting roll angle in an inertial measurement system for a longitudinal projectile, the method comprising the inertial measurement system performing the steps of:
    computing a current projectile attitude comprising a roll angle, a pitch angle and a yaw angle;
    for at least two time points during a flight of the projectile, comparing the computed pitch and yaw angles with expected values for the pitch and yaw angles;
    for each of said at least two time points, calculating a roll angle error based on the difference between the computed pitch and yaw angles and the expected pitch and yaw angles;
    calculating a roll angle error difference between said at least two time points;
    calculating the total roll angle subtended between said at least two time points;
    calculating a roll angle scale factor error based on said computed roll angle error difference and said total subtended roll angle; and
    correcting the roll angle by applying the calculated roll angle scale factor error to the output of a roll gyro.

14. A method as claimed in claim 13, wherein the roll angle error is calculated as the angle whose tangent is the ratio of the rate of change of the calculated yaw angle to the rate of change of the calculated pitch angle.

15. A method as claimed in any claim 13, wherein the method makes no use of linear accelerometers.

* * * * *